Aug. 16, 1938.  C. E. K. MEES  2,127,340
PHOTOGRAPHIC EMULSION CONTAINING SUPERSENSITIZED THIAZOLOCARBOCYANINES
Filed March 29, 1937

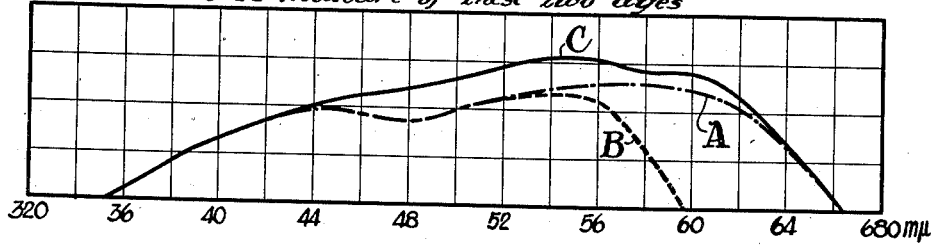

Fig.1.
A = 3,3'-Dimethyl-7-ethyl-4,4'-diphenylthiazolocarbocyanine iodide
B = 1,1'-Diethyl-2,2'-cyanine iodide
C = A mixture of these two dyes

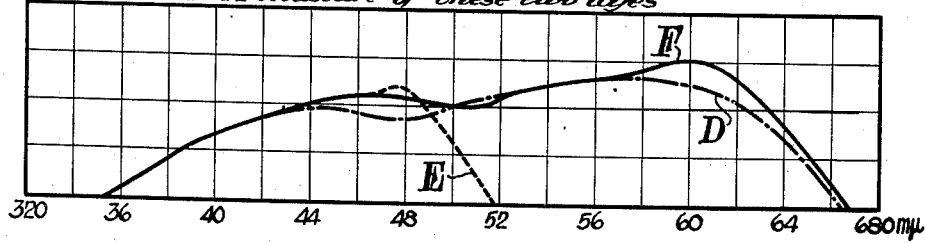

Fig.2.
D = 3,3'-Dimethyl-7-ethyl-4,4'-diphenylthiazolocarbocyanine-iodide
E = 3,1'-Diethyl-4-phenyloxazolo-2'-cyanine iodide
F = A mixture of these two dyes Charles E. K. Mees,
INVENTOR:
BY N. M. Perrin
Daniel J. Mayne
ATTORNEYS.

Patented Aug. 16, 1938

2,127,340

UNITED STATES PATENT OFFICE 2,127,340

PHOTOGRAPHIC EMULSION CONTAINING SUPERSENSITIZED THIAZOLOCARBOCYANINES

Charles E. K. Mees, Rochester, N. Y., assignor to Eastman Kodak Company, Rochester, N. Y., a corporation of New Jersey Application March 29, 1937, Serial No. 133,582

13 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by my combinations is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photographic emulsions that certain dyes of the cyanine class alter the sensitivity of photographic emulsions of the gelatino-silver-halide type, when incorporated therein. The sensitizing effect produced by the dyes does not increase proportionally to the amount of dye, but passes through a maximum as the concentration is increased. Within the range of concentration most useful in practice, the sensitivity increases much more slowly than the concentration of the dye. Likewise, the combined effect of two or more dyes on an emulsion is rarely equivalent to the sum of their separate effects, in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found with certain mixtures or combinations of two or more cyanine dyes, that the sensitization is substantially greater, in some spectral region, than that of any one of the dyes in the absence of the other or others. I will call this phenomenon supersensitization. In general, at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a highly specific phenomenon and is found only in mixtures or combinations of dyes from certain groups. In the instant application, this phenomenon generally takes the form of an increase in the sensitization produced by one or more dyes for the red end of the spectrum, upon the admixture of one or more dyes which in themselves are sensitizers for only shorter wavelengths. The magnitude of supersensitization depends upon the relative and absolute concentrations of the dyes in the emulsion and on the type of emulsion. In the instant application, the supersensitizing effects have been clearly demonstrated under suitable conditions which are applicable to commercial practice.

This application deals with emulsions containing supersensitizing mixtures or combinations of one or more thiazolocarbocyanine dyes with one or more pseudocyanine dyes. Just how the dyes of my mixtures cooperate to give a supersensitizing effect is not known. I shall refer to the mixtures as combinations, although I do not intend to imply that the dyes are chemically combined.

Unlike the carbocyanines described in my copending application Serial No. 120,966, filed January 16, 1937, the thiazolocarbocyanine dyes of the instant application show supersensitizing effects when the trimethenyl chain is devoid of substituents as well as when the trimethenyl chain carries alkyl groups on any of the three carbon atoms.

An object of my instant invention, therefore, is to provide photographic emulsions containing supersensitizing combinations of cyanine dyes. A further object is to provide a process for sensitizing photographic emulsions with supersensitizing combinations of dyes and to provide a method of increasing the red sensitivity of emulsions sensitized to the red region of the spectrum. A still further object is to provide a photographic element comprising a support coated with such supersensitized emulsions. Other more specific objects will become apparent hereinafter.

The dyes which I employ in my supersensitizing combinations are sensitizers of photographic emulsions when incorporated therein alone. While there is more than one manner of formulating and naming the dyes which I employ in practicing my invention, it is believed that the formulas, systems of nomenclature and names used herein are in accordance with those used during the development of the cyanine dye art to its present stage. The most probable formulas of representative dye-types are given below, in order to clearly set forth the nature of the materials employed in my supersensitizing mixtures. These formulas should not be construed as limiting my invention.

Among the thiazolocarbocyanine dyes useful in practicing my invention are those which can be represented by the following general formula:

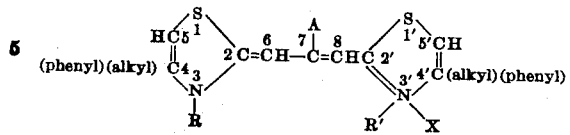

In the above formula, A represents hydrogen or an alkyl group, R and R' represent alkyl groups and X represents an acid radical. I have found it convenient to employ the carbocyanine dye-iodides (where X represents iodine) in practicing my invention. However, other dye-salts can be employed, for example, chlorides, bromides, perchlorates, alkylsulfates or alkyl-p-toluenesulfonates. I have found it advantageous to employ dyes wherein R and R' represent alkyl groups of one to four carbon atoms, such as methy, ethyl, butyl, isobutyl, β-hydroxyethyl or allyl, for example. I have further found the dyes wherein R and R' represent methyl groups to be especially useful. The five-position of the thiazole nuclei can be substituted with alkyl or phenyl groups. Symmetrical or unsymmetrical thiazolocarbocyanine dyes can be employed.

Thiazolocarbocyanine dyes can be prepared as described by Fisher and Hamer in the Journal of the Chemical Society (1930), pages 2502–2510. 7-alkylthiazolocarbocyanines can be prepared as described in U. S. Patent 1,973,462. The 7-alkyl-thiazolocarbocyanines are particularly useful in practicing my invention.

Among the pseudocyanine dyes which can be employed in practicing my invention are the following:

The thia-2'-cyanine dyes which can be represented by the following general formula:

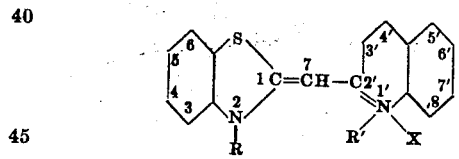

The selena-2'-cyanine dyes which can be represented by the following general formula:

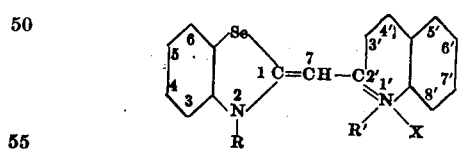

The 2,2'-cyanine dyes which can be represented by the following general formula:

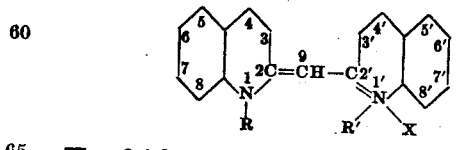

The 3,4-benzothia-2'-cyanines which can be represented by the following general formula:

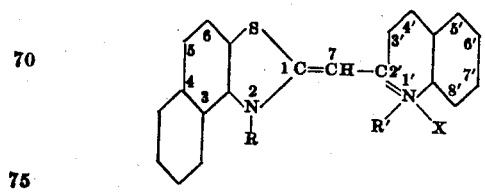

The oxazolo-2'-cyanines which can be represented by the following general formulas:

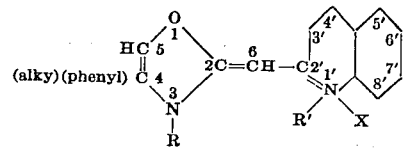

In all of the above formulas of pseudocyanine dyes, R and R' represent alkyl groups and X represents an acid radical. The oxazolo-2'-cyanine dyes can be substituted in the 5-position with substituents, such as alkyl or aryl groups of the benzene series, for example, phenyl. In practicing my invention I have found it convenient to employ the pseudocyanine-dye iodides (wherein X represents iodine). However, other pseudocyanine salts can be employed, such as, for example, as the chlorides, bromides, perchlorates, alkylsulfates, or alkyl-p-toluenesulfonates. I have found it advantageous to employ pseudocyanine dyes wherein R and R' represent an alkyl group of one to four carbon atoms, such as methyl, isobutyl, ethyl, n-butyl, allyl or β-hydroxyethyl, for example. The dyes wherein R and R' represent ethyl are particularly useful in practicing my invention. The pseudocyanine dyes can be substituted in their nuclei with simple substituents which do not interfere with sensitizing properties, such, for example, as alkyl, chloro, alkoxy or amino groups.

Brooker and Keyes in the Journal of the American Chemical Society, vol. 57, pages 2488–2491 (1935) have reviewed the literature pertaining to pseudocyanine dyes and described methods for the preparation thereof. Oxazolo-2'-cyanine dyes are described in U. S. Patent No. 1,969,446.

Cyanine dyes containing hydroxyalkyl groups can be prepared from cyclammonium quaternary salts prepared by reacting heterocyclic nitrogen bases with halohydrins, e. g. ethylene halohydrins and propylene halohydrins. It is advantageous to employ the bromohydrins. The heterocyclic nitrogen base and the bromohydrin are merely heated together for several hours, e. g. 25 to 30 hours or longer, at about 100° C., though 150° C. can be employed. An excess of the bromohydrin is advantageously employed. Following the reaction, the solid reaction product is advantageously converted to the iodide by treatment with potassium iodide. This can be accomplished by dissolving the crude quaternary bromide in hot water and treating the solution with a hot aqueous solution of potassium iodide (1 g. per cc. of water). Cyanine dyes containing hydroxy-alkyl groups are described in the application of Leslie G. S. Brooker and Lloyd A. Smith, Serial No. 133,524, filed of even date herewith.

The objects of my invention can be accomplished by merely incorporating one or more sensitizing thiazolocarbocyanine dyes together with one or more sensitizing pseudocyanine dyes capable of supersensitizing the thiazolocarbocyanine dye in a photographic emulsion. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein described supersensitized emulsions were prepared employing an ordinary gelatino-silver-bromide emulsion of ordinary concentration (approximately 40 g. of silver halide per liter). The dyes were generally employed in concentrations of the order of 10 mg. each per liter of ordinary emulsion, but can be employed in concentrations several times greater or less than that. The ratio of concentration of the thiazolocarbocyanine dye to the concentration of the pseudocyanine dye may be varied widely from 5:1 to 1:5, for example. The most favorable conditions for supersensitization of the desired magnitude must be determined by experiment, the manner of which will be apparent to those skilled in the art upon a complete perusal of these specifications.

The methods of incorporating dyes in emulsions are simple and well known to those skilled in the art. In practicing my invention, the dyes of my combinations can be added separately or together. It is convenient to add the dyes separately in the form of their solutions in appropriate solvents. The solvents must, of course, be compatible with the emulsion, substantially free from any deleterious effect on the light-sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate, other cellulose derivatives or resin in a manner well known in the art.

The following combinations or mixtures of dyes are illustrative of my invention. These illustrations are not intended to be limiting:

| Thiazolocarbocyanines | Pseudocyanines |
| --- | --- |
| 3,3',4,4'-tetramethylthiazolocarbocyanine iodide | with 2,1'-diethylthia-2'-cyanine iodide |
| 3,3'-dimethyl-4,4'-diphenyl thiazolocarbocyanine iodide | Do. |
| Do. | with 1,1'-diethyl-2,2'-cyanine iodide |
| 3,3',4,4'-tetramethylthiazolocarbocyanine iodide | Do. |
| 3,3'-dimethyl-4,4'-diphenyl thiazolocarbocyanine iodide | with 3,1'-diethyl-4-phenyloxazolo-2'-cyanine iodide |
| 3,3'-dimethyl-4,4'-diphenyl-7-ethylthiazolocarbocyanine iodide | with 2,1'-diethylthia-2'-cyanine iodide |
| Do. | with 2,1'-diethyl-6'-methyl-3,4-benzothia-2'-cyanine iodide |
| Do. | with 1,1'-diethyl-2,2'-cyanine iodide |
| Do. | with 3,1'-diethyl-4-phenyloxazolo-2'-cyanine iodide |
| 3,3',7-trimethyl-4,4'-diphenyl-thiazolocarbocyanine | with 2,1'-diethylthia-2'-cyanine iodide |
| Do. | with 2,1'-diethyl-4-chlorothia-2'-cyanine iodide |
| Do. | with 3,1'-diethyl-4-phenyloxazolo-2'-cyanine iodide |

While I have illustrated only combinations containing one thiazolocarbocyanine and one pseudocyanine, my combinations can as well contain one thiazolocarbocyanine cooperating with two pseudocyanines to give a supersensitizing effect. Likewise, my combinations can contain two pseudocyanines cooperating with one thiazolocarbocyanine.

I have found the combinations containing 7-alkylthiazolocarbocyanines to be particularly useful. The ordinary red sensitivity of the 7-alkyl dye is greatly increased in the presence of pseudocyanines. Pseudocyanine dyes containing the 5,6-benzothia nucleus are almost generally of lesser utility in practicing my invention, combinations containing such dyes ordinarily showing smaller, and in many cases, much smaller supersensitizing effects. Among the oxazolo-2'-cyanines, those substituted in the 4-position of the oxazole nucleus by an alkyl group, such as methyl, or particularly by an aryl group of the benzene series, such as phenyl, are especially useful in practicing my invention.

The accompanying drawing is by way of illustration and depicts the supersensitizing effect of two of my new combinations. Each figure of the drawing is a diagrammatic reproduction of three spectrograms showing, first, the sensitivity of a silver bromide emulsion containing a thiazolocarbocyanine dye (represented by the dot-and-dash line in each figure), second, the sensitivity of the same silver bromide emulsion containing a pseudocyanine dye (represented by the dotted line in each figure), and third, the sensitivity of the same emulsion containing a mixture or combination of the said thiazolocarbocyanine dye with the said pseudocyanine dye (represented by the solid line in each figure). The supersensitizing effect is apparent from the drawing.

In Fig. 1 of the drawing, curve A represents the sensitivity of an ordinary gelatino-silver-bromide emulsion containing 3,3'-dimethyl-7-ethyl-4,4'-diphenylthiazolocarbocyanine iodide in a concentration of about 10 mg. per liter of emulsion, curve B represents the sensitivity of the same emulsion containing 1,1'-diethyl-2,2'-cyanine iodide in a concentration of about 20 mg. per liter of emulsion, and curve C represents the sensitivity of the same emulsion containing 3,3'-dimethyl-7-ethyl-4,4'-diphenylthiazolocarbocyanine iodide and 1,1'-diethyl-2,2'-cyanine iodide in concentrations of about 10 mg. and 20 mg. per liter of emulsion, respectively. The red sensitivity of the emulsion represented by curve C, measured through a Wratten "A" filter is 60% greater than that of the emulsion represented by curve A.

In Fig. 2, curve D represents the sensitivity of an ordinary silver-bromide emulsion containing 3,3'-dimethyl-7-ethyl-4,4'-diphenylthiazolocarbocyanine iodide in a concentration of about 10 mg. per liter, curve E represents the sensitivity of the same emulsion containing 3,1'-diethyl-4-phenyloxazolo-2'-cyanine iodide in a concentration of about 20 mg. per liter, and curve F represents the sensitivity of the same emulsion containing 3,3'-dimethyl-7-ethyl-4,4'-diphenylthiazolocarbocyanine iodide and 3,1'-diethyl-4-phenyloxazolo-2'-cyanine iodide in concentrations of about 10 mg. and 20 mg. per liter, respectively. The red sensitivity of the emulsion represented by curve F, measured through a Wratten "A" filter is 100% greater than that of the emulsion represented by curve D.

The spectrograms corresponding to the figures of the accompanying drawing were made in a grating spectrograph with an optical wedge having an optical density gradient of 1.0 for each horizontal line in the spectrogram. Where the spectrograms were compared, as in each of the figures of the drawing, the exposures were for the same time and test plates of each group were developed together.

Still further examples showing the application of my invention could be cited, but the foregoing will be sufficient to teach those skilled in the art the manner in which my invention is carried out and the principles of sensitizing photographic emulsions with supersensitizing combinations such as described herein.

This application is a continuation-in-part of my copending applications Serial Nos. 641,177, 641,178, and 641,179, filed November 4, 1932, matured into United States Patents 2,075,046; 2,075,047 and 2,075,048, respectively, each dated March 30, 1937, and of my copending applications Serial Nos. 120,966 and 120,967, filed January 16, 1937.

What I claim as my invention and desire to be secured by Letters Patent of the United States is:

1. A photographic silver halide emulsion containing a supersensitizing combination of at least one sensitizing thiazolocarbocyanine dye with at least one sensitizing pseudocyanine dye.

2. A photographic gelatino-silver-halide emulsion containing a supersensitizing combination of at least one sensitizing thiazolocarbocyanine dye with at least one sensitizing pseudocyanine dye.

3. A photographic gelatino-silver-halide emulsion containing a supersensitizing combination of at least one sensitizing 7-alkylthiazolocarbocyanine dye with at least one sensitizing pseudocyanine dye.

4. A photographic gelatino-silver-halide emulsion containing a supersensitizing combination of at least one sensitizing thiazolocarbocyanine halide with at least one sensitizing pseudocyanine halide.

5. A photographic silver halide emulsion containing a supersensitizing combination of at least one sensitizing 4,4'-dialkylthiazolocarbocyanine dye with at least one sensitizing pseudocyanine dye.

6. A photographic silver halide emulsion containing a supersensitizing combination of at least one sensitizing 4,4'-diphenylthiazolocarbocyanine dye with at least one sensitizing pseudocyanine dye.

7. A photographic silver halide emulsion containing a supersensitizing combination of at least one sensitizing 4,4'-diphenyl-7-alkylthiazolocarbocyanine dye with at least one sensitizing pseudocyanine dye.

8. A photographic gelatino-silver-halide emulsion containing a supersensitizing combination of at least one sensitizing thiazolocarbocyanine dye with at least one sensitizing pseudocyanine dye selected from the group consisting of 2,2'-cyanine, thia-2'-cyanine, selena-2'-cyanine, 3,4-benzothia-2'-cyanine and oxazolo-2'-cyanine dyes.

9. A photographic gelatino-silver-halide emulsion containing a supersensitizing combination of at least one sensitizing 3,3',4,4'-tetramethylthiazolocarbocyanine dye with at least one pseudocyanine dye.

10. A photographic gelatino-silver-halide emulsion containing a supersensitizing combination of at least one sensitizing 3,3',4,4'-tetramethylthiazolocarbocyanine dye with at least one 1,1'-diethyl-2,2'-cyanine dye.

11. A photographic gelatino-silver-halide emulsion containing a supersensitizing combination of at least one sensitizing 3,3'-dimethyl-4,4'-diphenyl-7-ethylthiazolocarbocyanine dye with at least one sensitizing pseudocyanine dye.

12. A photographic gelatino-silver-halide emulsion containing a supersensitizing combination of at least one sensitizing 3,3'-dimethyl-4,4'-diphenyl-7-ethylthiazolocarbocyanine dye with at least one 1,1'-diethyl-2,2'-cyanine dye.

13. A photographic gelatino-silver-halide emulsion containing a supersensitizing combination of at least one sensitizing 3,3'-dimethyl-4,4'-diphenyl-7-ethylthiazolocarbocyanine dye with at least one 3,1'-diethyl-4-phenyloxazolo-2'-cyanine dye.

CHARLES E. K. MEES.